J. A. HOWARD, Sr.
ELECTRIC STOVE.
APPLICATION FILED JULY 3, 1920.

1,383,949.

Patented July 5, 1921.

John A. Howard, Sr.
INVENTOR

BY Victor J. Evans
ATTORNEY

WITNESS

UNITED STATES PATENT OFFICE.

JOHN A. HOWARD, SR., OF WEST NEW BRIGHTON, NEW YORK, ASSIGNOR TO CAMWARD ENGINEERING CO. INC., A CORPORATION OF NEW YORK.

ELECTRIC STOVE.

1,383,949.   Specification of Letters Patent.   Patented July 5, 1921.

Application filed July 3, 1920. Serial No. 393,847.

*To all whom it may concern:*

Be it known that I, JOHN A. HOWARD, Sr., a citizen of the United States, residing at West New Brighton, S. I., in the county of Richmond and State of New York, have invented new and useful Improvements in Electric Stoves, of which the following is a specification.

This invention relates to improvements in electric stoves and the principal object is to provide a suitable and extremely efficient stove for use with my improved cooking utensils shown in my allowed application Serial No. 274,047, filed January 30th, 1919.

Another object is to provide a stove with a heating element so positioned as to be protected from injury by the "boiling over" of the utensil heated.

Another object is to give a larger heating surface in a small radius.

With these and incidental objects in view, the invention consists in certain novel construction and combination and arrangement of parts, the essential features of which are hereinafter described and claimed and which are illustrated in the accompanying drawing comprising one sheet, in which:—

Like characters of reference refer to like parts in both views.

Figure 1:
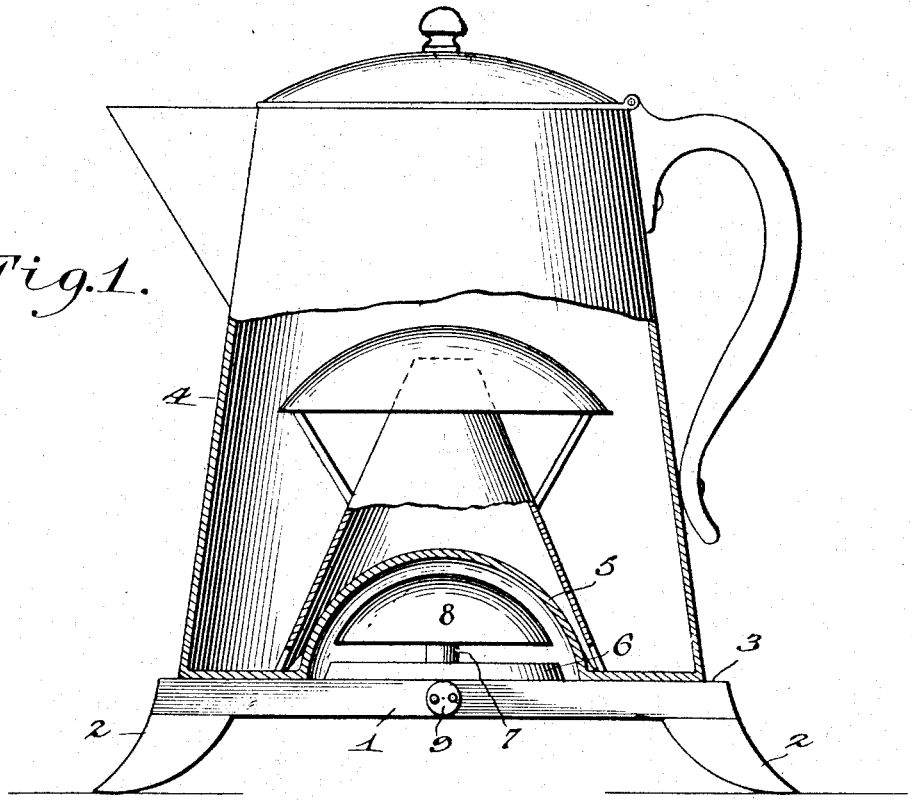
Figure 1 is a vertical sectional elevation of my improved stove showing its use in connection with a utensil of the type described in my said application Serial No. 274,047.
Figure 2:
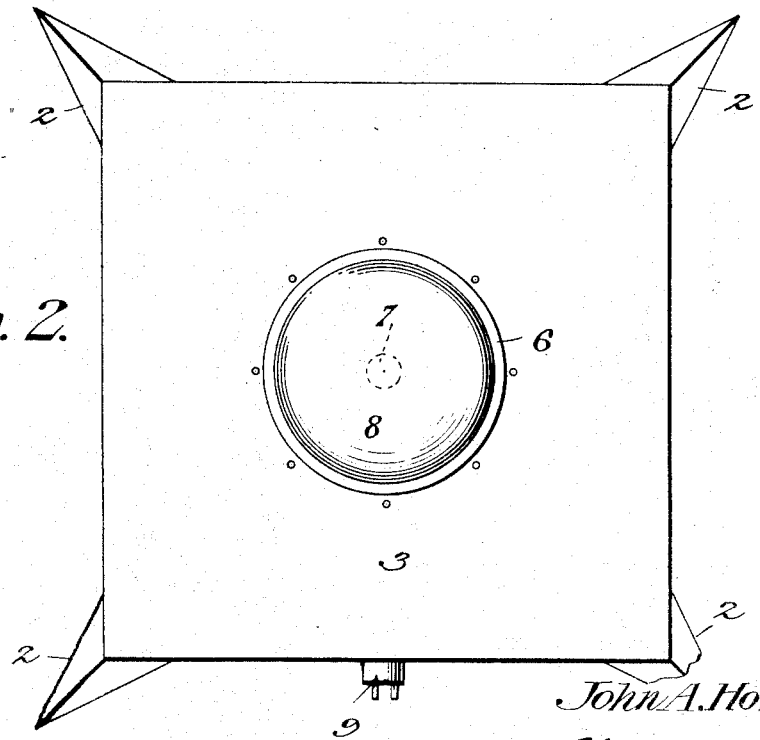
Fig. 2 is a top plan view of the stove alone.

This invention contemplates the providing of an electric stove with an upstanding curvilinear heating element raised from the floor on which the vessel to be heated stands.

Referring more particularly to the drawing, 1 represents the base of the stove which may be of any suitable shape or structure and which is provided with legs 2 and a flat floor portion 3 upon which may be set the utensil to be heated. This utensil in the present instance is shown as a coffee pot 4 of the type set forth in my application Serial No. 274,047, having a cavity or hollow 5 formed in its bottom and provided interiorly with a removable device which coacts with said hollow.

Formed on the base 1 near the center thereof is an elevated portion 6 from which rises a standard 7 supporting a dome like heating element 8. Means are provided at 9 for connecting with a source of electrical energy.

While I have shown a coffee pot in the drawings, it is to be understood that I contemplate constructing a number of utensils in a similar manner for use with the herein described improved stove.

The above described embodiment of my invention is deemed to be the most desirable one, but it is obvious that many details may be varied without in any way departing from the spirit of my invention; and I therefore do not limit myself to the exact details of construction herein set forth nor to anything less than the whole of my invention limited only by the appended claim.

What I claim as new and desire to secure by Letters-Patent is:—

In a cooking means, a utensil having a closed central chamber rising from its bottom and also having a flat bottom portion surrounding said chamber, in combination with a stove comprising a base portion with a flat upper surface on which said flat bottom portion of the utensil is superimposed, and an electrical heating element rising from said base portion of the stove and disposed in said chamber of the utensil, whereby the opposed coöperating surfaces of the bottom portion of the utensil and the base portion of the stove are adapted to confine heat in said utensil chamber.

In testimony whereof I have affixed my signature.

JOHN A. HOWARD, SR.